Nov. 20, 1962     J. O. SCHAEFER     3,065,008
CONNECTING DEVICE
Filed Sept. 6, 1960

INVENTOR
JOHN O. SCHAEFER

BY K. P. Johnson
ATTORNEY.

3,065,008
Patented Nov. 20, 1962

3,065,008
CONNECTING DEVICE
John O. Schaefer, Lexington, Ky., assignor to International Business Machines Corporation, New York, N.Y., a corporation of New York
Filed Sept. 6, 1960, Ser. No. 54,218
6 Claims. (Cl. 287—61)

This invention relates generally to devices for connecting links or rods of a linkage system, and more specifically to a connecting device for adjusting the effective length of a link or rod in such a system.

In mechanical linkages composed of a series of interconnected links and levers, faulty operation often results because these elements become worn or damaged, thus altering the desired ratio of input to output motion. Although the links can be repaired or replaced, provision is usually made for this eventuality by inserting an adjustable device between a lever and its connected rod with which to vary the effective length of the rod. A device often used is an adjustable yoke-end or clevis.

The clevis is generally a U-shaped member having a hole in each extending arm in alignment with each other through which a pin may be inserted for attachment with one member of the linkage. The base of the U-shaped member has a hole therein through which a threaded rod-end may be inserted and held securely by an adjustable nut. The effective length of the rod can then be varied by adjusting the location of the nut along the rod. In some applications an internally threaded sleeve is rotatably supported in the base hole by the U-shaped member so that by rotating the sleeve along the threaded rod in the appropriate direction the effective length of the rod may be increased or decreased. The inclusion of a sleeve avoids the necessity of having to reach the adjusting nut between the arms of the U-shaped member and avoids disconnection of linkage elements during adjustment. When either the nut or sleeve is to be changed each is required to be radially exposed so that a tool such as a wrench can be applied to make the adjustment.

The problem of providing room for future adjustments in a linkage system becomes acute in many instances where numerous independent linkages are confined in a small space and each of the linkages requires adjustment at some time. An example of this is a typewriter where dozens of small linkages employing clevises are located proximately to one another. Each of these linkages requires adjustment during the assembly of the machine and many require subsequent adjustments throughout the life of the machine.

Once an adjustment has been made, it is imperative that the nut or sleeve does not change its location along the rod-end because of impact or vibration during the operation of the linkage system. The adjustment is usually maintained by providing either a lock nut for the adjusting nut or a separate resilient detent for the sleeve which becomes seated in one of a plurality of notches in the U-shaped member. Thus, if a lock nut is used an adjustment entails moving two nuts, and if a detent is used on a sleeve, the minimum degree of rotation for adjusting the sleeve is that distance between successive detents on the U-shaped member.

Therefore, a device is required which permits easy accessibility and adjustment to any degree of rotation, which has a minimum of parts, and which avoids the need for any disconnection of elements for the adjustment. The clevis should also be capable of inexpensive manufacture, not requiring expensive machining operations.

Accordingly, it is the principal object of this invention to provide an improved adjustable clevis for varying the effective length of a rod in a linkage system.

It is another object of this invention to provide an adjustable clevis for a linkage system which requires a minimum amount of space for the adjustment.

Other objects of this invention are to provide an adjustable clevis readily accessible to be varied by any desired amount, unlimited by fixed increments, without any disassembly of parts; and to provide an adjustable clevis in which any adjustment will be automatically maintained at the position desired.

In accordance with the foregoing objects, this invention provides an inner sleeve rotatably supported by concentric outer sleeve means. The inner sleeve has a locating means thereon to keep it axially oriented with the outer sleeve means, and is provided with internal threads for attachment with a threaded rod-end. The outer sleeve means is, in effect, two sleeves held in spatial alignment by a pair of arms eccentrically attached at the side of these sleeves which extend beyond the sleeves to also serve as a connecting means for the outer sleeve means with another member of the linkage system. The arms are offset from the longitudinal axis of the rod-end and inner sleeve so that the inner sleeve may be axially engaged at its end for rotation and adjustment. Restraining means are formed in the wall of the outer sleeve means to frictionally bear against the periphery of the inner sleeve to maintain any desired adjustment thereof.

A feature of this invention is that the outer sleeve means and arms can be stamped from sheet material and formed about the inner sleeve to permit low cost production of the clevis. The invention has the advantages of being compact, adaptable to manufacture over a wide range of sizes, and permitting the elimination of much of the machining presently required in adjustable clevises. Since the restraining means is integral with the outer sleeve means, a reduction in the number of clevis components is achieved without foregoing any of the necessary features.

The foregoing and other objects, features and advantages of the invention will be apparent from the following more particular description of a preferred embodiment of the invention, as illustrated in the accompanying drawings.

Figure 1:
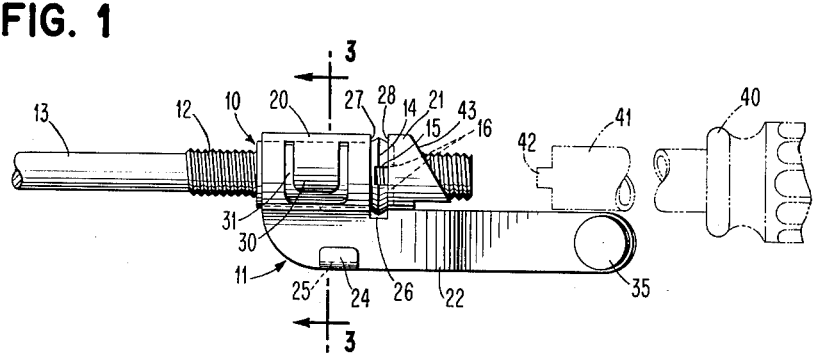
FIGURE 1 is a side elevation view of an adjustable clevis embodying the invention.

Referring now to the figures, the illustrative embodiment of the invention shown therein is an adjustable clevis consisting of two elements, an inner sleeve denominated generally as 10, and a support member or yoke denominated generally as 11. The inner sleeve 10 is internally threaded so that it can be attached to the threaded rod-end 12 of linkage rod 13. The outer diameter of sleeve 10 is uniform except for an annular collar 14 formed near one end thereof. A pair of notches 15, diametrically opposite, are cut in the inner sleeve wall at one end of the sleeve to provide a plurality of tabs 16. The tabs may be engaged to rotate the sleeve and move it along the threaded portion 12 of rod 13. The number of tabs which are formed is optional and will depend upon the size of the sleeve and the load upon the sleeve when an adjustment is to be made.

Figure 2:
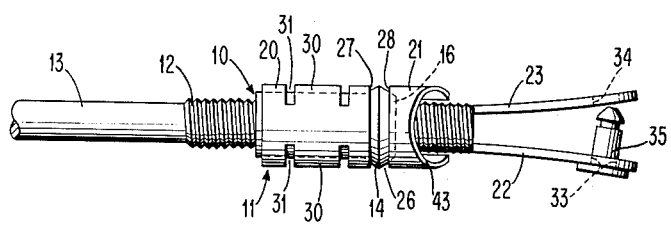
FIGURE 2 is a top view of the adjustable clevis shown in FIG. 1.
Figure 3:
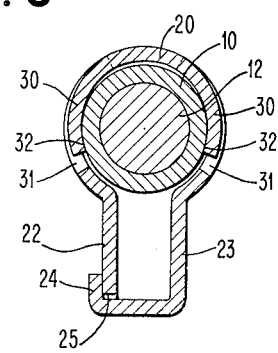
FIGURE 3 is a sectional view taken along the line 3—3 of FIG. 1 looking in the direction of the arrows.

Yoke 11 is substantially a U-shaped member having a slotted bottom portion and stamped from sheet material. The bottom portion of the U is of such a length as to substantially encompass the inner sleeve (as shown by FIG. 3) to thus form a pair of outer sleeve portions 20 and 21. The outer sleeves are formed about the inner sleeve 10 so that sufficient clearance exists between the inner and outer sleeves to permit rotation of the inner sleeve relative to the outer sleeves, with the exception of restraining fingers 30 to be described below. The sides of the U-shaped yoke form arms 22 and 23 which are used to attach the clevis to a remote linkage member (not shown). Yoke 11 is maintained in its wrapped position about inner sleeve 10 by tab 24 formed on arm 23 (FIG. 3), and bent over arm 22. A cut-out 25 is provided on arm 22 as a seat for tab 24 so that a smooth contour is maintained along the periphery of arm 22. Inner sleeve 10 is maintained in its axial position relative to the outer sleeves 20 and 21 of the yoke by the coincidence of the collar 14 of the inner sleeve with gap 26 between sleeves 20 and 21 as seen in FIGS. 1 and 2. Edges 27 and 28 of the outer sleeves 20 and 21, respectively, abut the collar 14 to restrict the inner sleeve from any axial movement relative to the yoke and yet permit the inner sleeve to be rotated within the yoke. As seen in FIG. 1, gap 26 must extend sufficiently downwardly into arms 22 and 23 to permit rotation of the annular collar 14. By closely confining collar 14 with the outer sleeve edges 27 and 28, lost motion between the inner sleeve and two outer sleeves can be kept at a minimum in a push-pull application of the clevis and the overall diameter of the clevis is minimized. Furthermore, the use of two outer sleeves 20 and 21 adds rigidity to the clevis in such an application by decreasing any kinking tendency between rod 13 and yoke 11.

In linkage systems where this adjustable clevis may be used, it is usually necessary that the adjustment of the sleeve 10 along the end of rod 13 be accurately maintained. Therefore, a restraining means is provided to insure that the inner sleeve does not freely rotate on rod 13 relative to the two outer sleeves 20 and 21 of yoke 11 when the linkage system is subjected to impact or vibration. The desired adjustment of the inner sleeve is accurately maintained by providing frictional restraint through fingers 30 formed in the opposite sides of outer sleeve 20. These fingers are formed by cutting a U-shaped slot 31 at appropriate locations in the outer sleeve wall and deforming the fingers inwardly toward the inner sleeve. The fingers are cut and deformed before yoke 11 has been wrapped about the inner sleeve. Upon finally forming the yoke about the inner sleeve, fingers 30 will contact the inner sleeve at points such as 32 (FIG. 3) to provide a constant frictional restraint against the rotation of inner sleeve 10 relative to outer sleeve 20. In the illustrated embodiment two fingers have been provided which bear against the inner sleeve in opposing directions to insure that no loss of adjustment will occur through clockwise or counterclockwise rotation of the inner sleeve. By using a frictional restraining means such as fingers 30, the inner sleeve is still capable of adjustment to any degree of rotation. If found necessary because of the particularly severe application in which the clevis is used, the external surface of the inner sleeve may be roughened as by knurling, to provide a more positive restraint on the rotation between the concentric sleeves. The number and location of these fingers may be varied according to the requirements of the particular application of the clevis. A material having a high yield strength is best suited for yoke 11 so that fingers 30 will retain a constant force against the periphery of inner sleeve 10.

As previously indicated, arms 22 and 23 of yoke 11 are to be attached to a remote member (not shown) of the linkage system. By using the center portion of the preformed yoke to form the outer sleeves 20 and 21, arms 22 and 23 are made parallel to one another and eccentrically offset (FIGS. 1 and 3) from the rotational axis of the concentric sleeves 10, 20 and 21. Tabs 16 on the end of inner sleeve 10 are exposed for adjustment when arms 22 and 23 are offset in this manner, so that the removal or disconnection of any parts in the linkage is unnecessary. The extreme ends of arms 22 and 23 (the right ends in FIGS. 1 and 2) are provided with holes 33 and 34, respectively, in substantial alignment with each other through which a pin 35 may be inserted to attach yoke 11 with the remote linkage member.

The effective length of rod 13 is determined by the location of inner sleeve 10 and thus yoke 11 along the rod. To accomplish the desired adjustment, sleeve 10 is threaded either toward or away from the end of rod 13, and for this purpose an adjusting tool 40 (illustrated in phantom in FIG. 1) may be provided. The adjusting tool has a hollow shank 41 with a plurality of tabs 42 formed thereon. Tabs 42 conform in number and location with notches 15 cut in inner sleeve 10 so that each tab fits within a corresponding notch 15. Since shank 41 of the adjusting tool is hollow, it will fit over threaded rod-end 12 to permit tabs 42 to engage the corresponding notches on the inner sleeve, should the rod-end extend through the inner sleeve. End 43 of outer sleeve 21 is cut off diagonally to serve as a locating guide and alignment support for tool 40 when the tool is engaged with tabs 16. The desired adjustment of the effective length of rod 13 may be accomplished by the appropriate amount and direction of rotation of sleeve 10 with adjusting tool 40. It will be noted that in order to accomplish the adjustment of the rod length, no parts need to be disconnected and that only a minimum of space is necessary for the adjustment. This permits grouping a plurality of clevises closely adjacent to one another.

Numerous modifications may be made in the illustrated embodiment. For instance, the inner sleeve may have an annular recess instead of a collar so that it may be held by a mating internal annular shoulder on one of the outer sleeves. The collar may also be replaced by a series of projections or its location varied along the inner sleeve. Further modification may be made by forming the restraining fingers on the end of one of the outer sleeves so that they would extend longitudinally of the sleeve axis and contact an extension of the inner sleeve.

While the invention has been particularly shown and described with reference to a preferred embodiment thereof, it will be understood by those skilled in the art that the foregoing and other changes in form and details may be made therein without departing from the spirit and scope of the invention.

I claim:

1. An adjustable device for coupling a threaded rod-end with a mechanical element comprising an internally threaded inner sleeve for connection with said rod-end and having a locating means formed thereon, a pair of coaxial outer sleeves substantially encompassing said inner sleeve allowing said inner sleeve to be rotated with respect to said coaxial outer sleeves to adjust the axial position of said inner sleeve with respect to said rod-end, said coaxial outer sleeves having a space therebetween, said locating means engaging said outer sleeves at said space to positively hold said inner sleeve from axial movement relative to said outer sleeves, and supporting means for holding said pair of outer sleeves in aligned relation, said supporting means having connecting means to attach said mechanical element thereto.

2. An adjustable connecting device mounted on the threaded end of a rod for connecting said device with a linkage member comprising, in combination, a first member having threads engaging the threads on said rod and having means formed thereon engageable by a tool to effect its rotation on said rod, a second member arranged concentrically with respect to said first member, said members being rotatable relative to each other, means positively preventing movement of said members relative to each other longitudinally of said rod, and connecting means fixed to said second member, said connecting means comprising an extension projecting beyond the end of said rod, and including a connecting portion for connection with said linkage member, said portion and extension lying entirely to one side of at least one plane passing through, and parallel to, the axis of said rod, whereby said engageable means are accessible by said tool along the unobstructed axis of said rod.

3. An adjustable device for coupling a threaded rod-end with a mechanical element, comprising an internally threaded inner sleeve for connection with said rod-end and having an external annular collar formed thereon, a pair of arms connectible to said mechanical element, said arms having fixed thereto a pair of coaxial outer sleeve elements substantially encompassing said inner sleeve and separated by a slot coinciding with said annular collar so that the axial movement of said collar is positively limited by said coaxial sleeve elements, said inner sleeve being rotatable with respect to said coaxial outer sleeve elements to adjust the axial position of said inner sleeve with respect to said rod-end.

4. A device for adjustably coupling a threaded rod-end with a mechanical element, comprising an internally threaded inner sleeve connected to said rod-end, a locating means on said inner sleeve, a pair of spaced outer sleeves concentric with and supporting said inner sleeve for rotation therein, said locating means abutting adjacent ends of said pair of outer sleeves to prevent axial movement of said inner sleeve relative to said outer sleeves, resilient restraining means formed on one of said outer sleeves extending inwardly therefrom to frictionally engage said inner sleeve to prevent free rotation of said inner sleeve relative to said outer sleeves, but allowing said inner sleeves to be rotated by overcoming said restraining means to vary the distance said rod-end extends into said outer sleeves, and connecting means attached to said outer sleeves for maintaining said outer sleeves in said spaced relation to each other and for coupling said outer sleeves to said mechanical element.

5. The device as described in claim 4 in which said connecting means extend parallel to the longitudinal axis of said inner sleeve and are entirely offset on the same side of a plane through said longitudinal axis a distance equal to at least the outer radius of said inner sleeve.

6. An adjustable device for coupling a threaded rod-end with a mechanical element comprising an internally threaded inner sleeve for connection with said rod-end and having a locating means formed thereon, a pair of coaxial outer sleeves substantially encompassing said inner sleeve and having a space therebetween, said locating means engaging said outer sleeves at said space to positively hold said inner sleeve from axial movement relative to said outer sleeves, one of said outer sleeves radially frictionally engaging said inner sleeve to prevent free rotation of said inner sleeve relative to said outer sleeves, but allowing said inner sleeve to be rotated by overcoming the frictional force exerted by said one outer sleeve and thereby adjusting the axial position of said inner sleeve with respect to said rod-end, and supporting means for holding said pair of outer sleeves in aligned relation, said supporting means having connecting means to attach said mechanical element thereto.

References Cited in the file of this patent
UNITED STATES PATENTS
1,397,373    Gemmer _____ Nov. 15, 1921